Patented Sept. 7, 1948

2,448,868

UNITED STATES PATENT OFFICE 2,448,868

METHOD OF RECOVERING PHTHALIC ANHYDRIDE

Walter M. Davis, Jamaica Plain, Mass., assignor to Monsanto Chemical Company, St. Louis, Mo., a corporation of Delaware No Drawing. Application December 18, 1944, Serial No. 568,785

4 Claims. (Cl. 260—342.5)

This invention relates to methods of removing phthalic anhydride from gases or vapors containing the same, and particularly relates to the recovery of phthalic anhydride from the hot reaction gases resulting from the vapor phase oxidation of polynuclear aromatic compounds, such as naphthalene, anthracene, the homologues of these compounds, and naphtho-quinone.

The separation of phthalic anhydride from such reaction gases, which usually come from the oxidation chamber or converter at a temperature between 400 and 500° C., is normally effected by cooling the gases by indirect heat exchange with air or other suitable cooling medium, such as water. Upon cooling down to about 130° C., the phthalic anhydride begins to condense out in the solid phase. Such methods, however, have been unsatisfactory, as the condensed solid material tends to adhere to the walls of the cooling chamber and requires either periodic interruptions of the process to effect its removal manually or the use of complicated mechanical equipment if interruptions are to be avoided. Manual removal requires access to the interior of the condenser and because of the irritating character of the organic anhydride upon mucous membranes presents a serious danger to workmen engaged in its removal.

It is a primary object of this invention to recover phthalic anhydride from hot reaction gases without resorting to the methods of the prior art as outlined above, which methods have been subject to the above and other difficulties.

Still further objects and advantages of the invention will appear from the following description and the appended claims.

In accordance with the present invention, the hot reaction gases containing phthalic anhydride as the main condensible constituent are passed, while still at a temperature above that at which phthalic anhydride condenses in the solid phase, into a cooling chamber, which may be in the form of a horizontal tube or vertical tower, wherein they are brought into direct and intimate contact with a fine water spray, which simultaneously cools the gas and causes precipitation of phthalic anhydride therefrom. In carrying out the process, the quantity of water used is sufficient to condense and precipitate the greater portion of the phthalic anhydride contained in the gases, but not enough to more than saturate the gases, that is, the amount of water used should preferably be less than that required to saturate the gases, but saturation is permissible provided no appreciable excess of water is employed. By controlling the amount of water in this way substantially complete evaporation of the water is insured prior to the removal of the condensed phthalic anhydride particles from the gas stream and a major portion of the phthalic anhydride is precipitated out without any appreciable hydration to phthalic acid taking place.

The Brown Patent No. 2,071,329 describes a process of recovering phthalic anhydride in accordance with which hot reaction gases containing phthalic anhydride are brought into direct contact with excessive amounts of water with the result that the phthalic anhydride in the gases is hydrated to phthalic acid and a solution or slurry is formed from which the phthalic acid must be separated. Moreover, the phthalic acid must be subsequently dehydrated to remove combined water before the final phthalic anhydride product can be obtained.

According to the present invention the amount of water used is controlled so that substantially all of it is evaporated by the time the condensed particles of phthalic anhydride leave the gas stream. Completion of evaporation is also insured by avoiding the use of excessively large particles of water, but within limits the effect of large particles can be overcome by providing a longer evaporation period, as for example, by increasing the height of the tower or the length of the pipe or tube used for condensing the gases.

It is customary in the manufacture of phthalic anhydride to preliminarily cool the gases coming from the converter in a series of steam boilers, which cool the gas down from about 450° C. to about 135° C. Thus, the gases going into the condenser are usually already partially cooled. In accordance with the present invention, the preliminarily cooled gases are further cooled to such an extent that the exit gases from the condenser are at temperatures between 70 and 85° C. This optimum range of temperatures is especially desirable, as under these conditions substantially no maleic anhydride is precipitated and the greatest amount of phthalic anhydride is condensed to the solid phase. It is possible however to cool the gases below 70° C. with satisfactory results, but they should not be cooled below about 50° C., as such temperatures would tend to prevent complete evaporation of the cooling water. Moreover, temperatures below 50° C. are apt to precipitate out undesired amounts of maleic anhydride. If the gases are not cooled to about 95° C. or lower, excessive amounts of phthalic anhydride tend to remain in the vapor phase.

The exact temperature obtained in the exit gases is a function of both the amount of water used in the condensing chamber and the temperature to which the hot reaction gases are preliminarily cooled in the steam boilers or other suitable coolers prior to entering the condenser. Although it is customary in the manufacture of phthalic anhydride to precool to about 135° C., it is not necessary in carrying out the present invention to adhere to this temperature, as good results may be obtained by preliminarily cooling the gases coming from the converter to a somewhat higher temperature. If exit gas temperatures as low as 50° C. are to be obtained, however, it is necessary to precool the gases to at least 135° C., and in some instances even lower, i. e., to 130° C. If exit gas temperatures as high as 95° C. are to be obtained, on the other hand, either less water is used or less or no preliminary cooling is applied.

The cooling chamber wherein the hot phthalic anhydride containing gases are brought into direct contact with the finely divided water spray may consist of a large tank or tower, or a length of horizontal pipe may be employed, depending on the method of collection of the precipitated anhydride used. Preferably a vertical tower is used which may be provided with means for heating the walls to keep them a few degrees warmer than the cooled gas, thereby preventing condensation thereon. Condensation and consequent accumulation of solidified phthalic anhydride on the walls is also prevented by placing the spray mechanism in such a position that the water spray contacts and cools the incoming hot gases before they have an opportunity to contact the chamber walls. It is also desirable to use a water spray having individual particles sufficiently small to evaporate before they impinge on any portion of the tower. A water spray of suitable fineness may be obtained either by pressure or air atomization, but other methods of spraying, such as mechanical atomizing or gas atomizing, may be utilized if desired.

By carrying out the cooling in accordance with the present invention substantially all of the phthalic anhydride in the reaction gases is condensed to the solid phase, the amount of anhydride vapor remaining in the exit gases being a function of the temperature and pressure. In general, it is advantageous to effect the cooling at substantially elevated pressures to reduce the quantity of phthalic anhydride vapor in the exit gases. However, good results may also be obtained by cooling the gases at atmospheric or even sub-atmospheric pressures.

The solid phthalic anhydride is removed from the gas stream by settling or by the use of centrifugal dust collectors or bag filters, or any combination of these methods may be used in sequence. Usually a large portion of the condensed anhydride is collected in the bottom of the condenser, the base of which may be steam heated to above 130° C., under which condition the particles of phthalic anhydride melt and may be drawn off in the liquid phase. If desired, however, the anhydride may be melted outside of the condenser and used directly as a crude product or piped to the refining still. The unrefined material may contain a small amount of phthalic acid, but the amount present is not sufficient to materially affect the crystallizing point of the product.

In order that a better understanding of the process of this invention may be had, the following example is given to illustrate a suitable method of operating the above described cooling or recovery system in connection with the catalytic oxidation of naphthalene by means of air.

A mixture of naphthalene vapor and air in the ratio of one pound of naphthalene to 240 cubic feet of air preheated to about 120° C. and at a pressure of approximately 18 pounds per square inch is supplied to a converter of conventional construction containing a suitable catalyst such as vanadium oxide. In the converter the naphthalene is oxidized primarily to phthalic anhydride, but a small amount of maleic anhydride is also formed. Upon leaving the converter the reaction gases which are at a temperature of about 450° C. are passed through a pair of preliminary coolers such as the usual steam boilers or the like, in the first of which they are cooled to about 200° C., and in the second to about 135° C. The gases thus partially cooled are then conducted to the upper portion of a cooling tower or condenser, where they are intimately mixed with a water spray supplied by means of an air atomizing nozzle located centrally in the top of the tower and adapted to direct the spray downwardly into the tower. The volume of water is regulated to cool the gases down to about 80° C. upon evaporation thereof, while the walls of the tower are heated to about 85° C. in order to prevent condensation thereon.

When the gases and water spray mix, particles of solid phthalic anhydride immediately form, which slowly agglomerate to form flakes. These flakes settle out and are collected at the bottom of the tower, the base of which is heated by any suitable means to about 155° C. to melt the flakes. The resulting liquid phthalic anhydride is then either continuously or periodically drained from the tower into a storage tank, in which the temperature of the liquid phthalic anhydride is maintained between 135 and 180° C. In accordance with usual practice, the gases which have been partly freed of the precipitated phthalic anhydride are passed into a centrifugal collector or cyclone, in which the remaining precipitated anhydride is separated. The gases leaving the cyclone are then conveyed to a scrub tower where the maleic anhydride is removed in the customary manner.

If a pressure atomizing nozzle is used to provide the water spray, it may be desirable to heat the water above 130° C. to assist in the atomizing and to prevent condensation of phthalic anhydride on the nozzle itself. Thus, either cold or hot water may be used for the cooling, since most of the cooling action is obtained as a result of evaporation.

In accordance with the above example, the spray nozzle is positioned in the upper central portion of the tower. It may however be located in the side wall, and if desired more than one nozzle may be employed either in concentric arrangement or at different levels in the tower. In all cases, however, it is desirable for the walls of the tower to be heated to a temperature a few degrees higher than the temperature of the cooled gases in the tower to prevent condensation or accumulation thereon.

Although it is customary first to cool the hot reaction gases not lower than 130° C. in conventional cooling apparatus, such as steam boilers, the advantages of this invention are also obtainable if the gases are next cooled to a still lower temperature, as for example in the usual condensers employing indirect heat exchange, and then still further cooled by means of the controlled water spray described herein. For example, it would be possible to use conventional condensers to cool the gases from 130° C. down to say 100° C., and then to cool down to as low as 50° C., or even as low as the dew point of the water, by the use of controlled amounts of direct water spray.

The condensing and cooling methods of this invention are exceedingly economical to carry out, since there is considerable saving in the labor and/or equipment required. According to prior methods, it was either necessary to provide complicated scraping equipment to remove accumulations on the walls of the condenser, or the entire operation had to be stopped periodically to permit the walls to be scraped manually, which also adds to the health hazard of the operation. Moreover, there is a considerably greater danger of explosion in the old type indirectly cooled condensers than in the condensers in which the methods of this invention are employed. The methods of this invention are also much more efficient, since it is possible to use one condensing tower or chamber where several of the same size were required by prior methods.

What I claim is:

1. The method of continuously removing phthalic anhydride from vapors containing the same which comprises continuously cooling said vapors initially at a temperature varying between 130 and 450° C. down to a temperature between 50 and 95° C. by bringing said vapors into direct and intimate contact with a water spray, the amount of water being not in excess of that required to cool said vapors down to between 50 and 95° C. by the complete evaporation of said water by the time the condensed particles of phthalic anhydride separate from said vapors, whereby a major proportion of said phthalic anhydride is condensed and precipitated as anhydride from said vapors, and separating said precipitated phthalic anhydride from the remainder of said vapors.

2. The method of continuously removing phthalic anhydride from vapors containing the same which comprises continuously cooling said vapors initially at a temperature of about 135° C. down to a temperature between 70 and 85° C. by bringing said vapors into direct and intimate contact with a water spray in the form of fine particles, the amount of water being not in excess of that required to cool said vapors down to between 70 and 85° C. by the complete evaporation of said water by the time the condensed particles of phthalic anhydride separate from said vapors, whereby a major proportion of said phthalic anhydride is condensed and precipitated as anhydride from said vapors, and separating said precipitated phthalic anhydride from the remainder of said vapors.

3. The method of removing phthalic anhydride from the hot gases resulting from the vapor phase partial oxidation of polynuclear aromatic compounds, which comprises continuously cooling said hot gases down to a temperature of about 95° C. by bringing said gases into direct and intimate contact with a water spray in the form of fine particles, the amount of water being not in excess of that required to cool said gases down to about 95° C. by the complete evaporation of said water by the time the condensed particles of said phthalic anhydride separate from said gases, whereby a major proportion of said phthalic anhydride is condensed and precipitated as anhydride from said gases, and separating said precipitated phthalic anhydride from the remainder of said gases.

4. The method of removing phthalic anhydride from the hot gases resulting from the vapor phase partial oxidation of polynuclear aromatic compounds, which comprises conducting said gases initially at a temperature varying between 130 and 450° C. into the upper end of a tower, cooling said gases down to a temperature between 50 and 95° C. by bringing said gases into direct and intimate contact with a water spray upon entering said tower, the amount of water being not in excess of that required to cool said gases down to between 50 and 95° C. by the complete evaporation of said water by the time the condensed particles of phthalic anhydride separate from said gases, whereby a major proportion of said phthalic anhydride is condensed and precipitated as anhydride from said gases, and collecting the precipitated phthalic anhydride at the bottom of said tower, the side walls of said tower being maintained during the cooling of said gases at a temperature a few degrees higher than the temperature of the cooled gases in said tower, whereby condensation of solid phthalic anhydride on said walls is avoided.

WALTER M. DAVIS.

REFERENCES CITED

The following references are of record in the file of this patent:

UNITED STATES PATENTS

| Number | Name | Date |
|---|---|---|
| 2,064,468 | Foster | Dec. 15, 1936 |
| 2,071,329 | Brown | Feb. 23, 1937 |
| 2,071,357 | Porter | Feb. 23, 1937 |
| 2,076,033 | Kniskern | Apr. 6, 1937 |